United States Patent [19]
Maurya

[11] Patent Number: 6,160,808
[45] Date of Patent: Dec. 12, 2000

[54] TECHNIQUE FOR TRANSMITTING INCOMING MULTI-LINK POINT-TO-POINT (PPP) PACKET TRAFFIC OVER MULTIPLE OUTGOING LINKS IN A MULTI-LINK BUNDLE

[75] Inventor: Sanjiv Kumar Maurya, Chicago, Ill.

[73] Assignee: 3Com Corporation, Santa Clara, Calif.

[21] Appl. No.: 08/993,541

[22] Filed: Dec. 18, 1997

[51] Int. Cl.$^7$ .................................................. H04L 12/28
[52] U.S. Cl. .......................... 370/389; 370/392; 370/395
[58] Field of Search ..................... 370/392, 395, 370/389, 352, 420, 421, 474, 470, 522, 524; 709/217, 218, 230

[56] References Cited

U.S. PATENT DOCUMENTS

| | | | |
|---|---|---|---|
| 5,878,040 | 3/1999 | Peirce, Jr. et al. | 370/389 |
| 6,018,767 | 1/2000 | Fijolek et al. | 709/218 |

OTHER PUBLICATIONS

P. Miller, TCP/IP Explained, Digital Press (©1997, Butterworth–Heinemann), pp. 402–434.

*Primary Examiner*—Chi H. Pham
*Assistant Examiner*—Brenda H. Pham
*Attorney, Agent, or Firm*—Michaelson & Wallace; Peter L. Michaelson

[57] ABSTRACT

A communications technique which permits incoming multi-link point-to-point (PPP) packets of a common PPP frame to be simultaneously transmitted across more than one outgoing link in a multi-link bundle. Specifically, during LCP negotiations, a multi-link PPP originator assigns itself a unique endpoint discriminator value and informs all its immediate PPP peers by sending the latter, via a first bundle of outgoing links, an LCP Endpoint Discriminator packet containing this value. Each of these immediate PPP peers assumes, as its endpoint discriminator, the value that has been provided to it in the LCP Endpoint Discriminator packet it receives from the originator and then sends an LCP Endpoint Discriminator packet containing this same endpoint discriminator value, via a second bundle of outgoing links, to all of its immediate PPP peers. This is recursively repeated until all hierarchically inter-connected multi-link PPP devices at one end of a pipe, which fan-out from the originator, have set their endpoint discriminators to the same value. Consequently, all the links in the pipe will be viewed, by the multi-link protocol, as part of a common bundle.

44 Claims, 6 Drawing Sheets

FIG. 1 PRIOR ART

LCP GENERAL PACKET
- FORMAT

FIG. 2 PRIOR ART

LCP CONFIGURATION REQUEST PACKET
- GENERAL FORMAT

TECHNIQUE FOR TRANSMITTING INCOMING MULTI-LINK POINT-TO-POINT (PPP) PACKET TRAFFIC OVER MULTIPLE OUTGOING LINKS IN A MULTI-LINK BUNDLE

BACKGROUND OF THE DISCLOSURE

1. Field of the Invention

The invention relates to a communications technique which permits incoming multi-link point-to-point (PPP) packets of a common PPP frame to be simultaneously transmitted across more than one outgoing link, e.g., a physical channel, in a multi-link bundle. This technique is particularly, though not exclusively, suited for supporting transmission of such incoming packets over several outgoing B-channels across multiple ISDN connections.

2. Description of the Prior Art

To facilitate carriage of datagrams of different network layer protocols, such as IP (Internet Protocol), IPX, DECnet, AppleTalk and others, over a single point-to-point link, a protocol, collectively referred to as the "PPP" protocol, has recently been developed. The PPP protocol has self-contained mechanisms for specifying a specific network layer protocol to be carried in a PPP packet, testing the link itself and negotiating a variety of options for facilitating efficient communication over that link.

In particular, the PPP protocol is itself formed of three basic constituents: (a) a method of encapsulating multi-protocol datagrams—though any one packet is limited to containing a datagram that uses just one network layer protocol; (b) a link control protocol (LCP) that is capable of establishing, configuring and testing a link which is to carry PPP packet traffic between two PPP peers; and (c) a family of network control protocols (NCPs) which collectively configure the link for the various network layer protocols (such as IP, IPX and others) to be used with datagrams to be carried over that link.

In operation, the LCP, executing at two PPP peers, each on an opposite side of the link, automatically negotiates and agrees on various operational characteristics to maximize the efficiency of the ensuing communication. These characteristics include, e.g., PPP encapsulation format, size of the packets to be used, detection of looped-back links, authentication and others. To accommodate datagrams with differing network layer protocols, each datagram is encapsulated, as payload information, in a corresponding PPP packet (as a PPP "frame") and is preceded, within that PPP packet, by a protocol field that specifies the particular network layer protocol associated with that particular datagram.

Before any data is transmitted over a PPP link, each PPP peer connected to one end of the link will send LCP configuration packets to the other end to establish and test the link; thus, ensuring the link is fully operational. Once the LCP protocol has successfully completed its negotiations, the PPP peers then negotiate the necessary NCPs to properly configure the link for the different network layer protocols that are to be used; with a different NCP being negotiated for each different network layer protocol. Once the NCP(s), for the various network layer protocols, have been successfully negotiated and configured at both PPP peers, then PPP packet traffic containing encapsulated data, using the network layer protocols, can commence over that link.

During the past five years, Internet usage, particularly that of the world wide web, has exploded and continues to do so. Substantial increases still occur, on a monthly basis, not only in the size of the user community but also in the number of operational web sites. Moreover, as potential and existing site proprietors realize the potential of the Internet to very inexpensively reach an ever-increasing and diverse pool of widely dispersed potential users, these proprietors continue to post vastly increasing amounts of data, specifically, e.g., files for increasingly sophisticated web pages that include both textual and graphical information, to their web sites for user selection and downloading. Each time a user stationed at, e.g., a personal computer (PC) and using a web browser, "clicks" on a hypertext link or otherwise selects a web page, a file containing, e.g., HTML (hypertext mark-up language) source code for that page is transmitted by a remote web server through an Internet connection to the personal computer for rendering thereat. In addition, the Internet is also increasingly being used as a cost-effective method to deliver software to end users; an item of software being transmitted, again as a file(s), though oftentimes in compressed form, from a remote "ftp" (file transfer protocol) server to a personal computer then being operated by that user. Moreover, currently, the Internet also sees exploding use for disseminating files containing information in other electronic forms, such as digitized full motion video, digitized still pictures, digitized audio files and others—again selectable and accessible for downloading by a user through, e.g. associated web pages.

While the growth in available information accessible over the Internet provides an ever-increasing user community with an overwhelmingly rich information source, and one that continues to expand at a staggering rate, this growth has engendered various problems which have adversely affected the user community.

First, not only are the downloadable files, whether containing source code for web pages, software or other information, increasing in astonishing numbers but these files are also becoming much larger in size. Compressed software files on the order of tens of megabytes are becoming rather common. Inasmuch as most users connect to the Internet through dial-up telephone connections which have a rather limited bandwidth, a significant amount of time ("download" time or latency) may be required for a user to completely download a file of interest, particularly if that file is rather large, such as on the order of several megabytes or more. Second, as more users simultaneously contend for available network bandwidth at particular times, such as when the network experiences its peak daily loading, the network becomes increasingly congested. Hence, at these times, network traffic tends to slow which also tends to lengthen download time, thereby frustrating the users particularly those seeking relatively large files.

A basic approach to remedying these problems lies in cost-effectively increasing the transmission bandwidth available to a user such that a file will require much less time to download, thereby easing user frustration particularly during periods of peak network congestion.

This approach is traditionally effectuated through providing a user with the ability to cost-effectively utilize a faster transmission channel, such as, e.g., an JSDN (Integrated Services Digital Network) line, than a conventional dial-up "plain old telephone service" (POTS) analog line or an increasingly faster modem for use with a POTs line. While both of these solutions have certainly alleviated the problem, as it presently exists, to a significant extent; the problem will undoubtedly return as file sizes continue to increase, and the user community and web sites both continue to explosively expand.

Another approach is often employed, in conjunction with using high speed transmission channels, to provide further increases in transmission bandwidth to a network user. In particular, the PPP protocol, through its LCP, fortunately provides a mechanism through a so-called "multi-link protocol" (frequently referred to as simply multi-link PPP), that can assign additional bandwidth, on demand, (so-called "BonDing") in those situations where two PPP peers can be connected through multiple physical links in a common bundle (the entire multi-linked connection is commonly referred to as a "pipe"). In essence, multi-link operation involves real-time allocation (and deallocation) of any number of these links in the bundle to a common communication channel, i.e., the pipe, in order to dynamically provide sufficient transmission bandwidth for the underlying communication that is then to be carried by the channel.

For example, consider multi-link PPP being used over a basic rate interface (BRI) ISDN connection. Once successfully negotiated between two PPP peers, then, at a transmitting peer, multi-link PPP segments a packetized data stream (i.e., a PPP frame) into segments (or fragments), forms a stream of multi-link PPP packets each containing one such a segment, and then assigns these multi-link PPP packets on an approximately equal basis, where practical, between two B channels in the BRI connection for transmission to a receiving PPP peer; here the two B channels form a pipe. Small packets may not be segmented and to accommodate links of different speeds (which is not the case with two ISDN B channels), the segments need not be of the same size nor do the same number of segments need to be transmitted over each link. In any event, each such multi-link PPP packet contains a sequence number—which increases by one with each successive packet, inserted by the multi-link protocol. At the receiving peer, the multi-link protocol extracts the segments from the received packets carried by the pipe, and re-assembles these segments into proper order based on their corresponding sequence numbers so as to properly and fully reconstruct the PPP frame.

One can readily appreciate that, by simultaneously utilizing available transmission bandwidth provided by multiple links to carry packet traffic that forms a PPP frame for a given user, multi-link PPP can significantly increase overall transmission bandwidth for that user.

However, the multi-link protocol, as it presently exists, suffers from a drawback that effectively prevents this protocol from providing even further increases in transmission bandwidth, particularly where, e.g., ISDN lines are used to carry packet traffic between two PPP peers.

In particular, to exploit the increased bandwidth available from simultaneous use of multiple links, a number of currently available and forthcoming client personal computer (PC) operating systems can segment a single PPP frame into multi-link PPP packets, i.e., for subsequent carriage across a pipe formed of separate corresponding physical links.

In this regard, multi-link PPP packets can be transported over, e.g., a pipe formed of a plurality of POTs lines, each with a separate modem and a corresponding serial communication port on a client PC. This approach operates quite well with communication devices, such as modems, that have one incoming data path and one outgoing data path and do not implement the PPP protocol. However, this approach does not function, owing to, what the art believes, is a limitation inherent in multi-link PPP frame re-assembly, with communication devices, such as ISDN terminal adapters, that possess one incoming data path and several outgoing data paths and implement the multi-link protocol.

To appreciate this limitation, consider a situation where a client PC were to generate multi-link PPP packets for a common PPP frame and distribute these packets among two or more separate links with a separate ISDN terminal adapter connected to each link. As noted above, each multi-link PPP packet would contain a sequence number, in this case assigned by the PC and which increments by one from each multi-link PPP packet for a common PPP frame to the next. To ensure proper ordering, each terminal adapter, were it to use the multi-link protocol, would buffer each incoming multi-link PPP packet it receives and then reorder its received packets based on their sequence numbers, and then transmit only properly reordered packets amongst its two ISDN B channels. If incoming multi-link PPP packets were received, but with gaps in their sequence numbers, a conventional terminal adapter, then executing the multi-link protocol, would simply buffer these incoming packets pending receipt of those packets containing the missing sequence numbers. However, these "missing" packets would never arrive at that particular terminal adapter. Specifically, since the client PC is intentionally distributing packets, generally on a round-robin basis, among several links to the terminal adapters, then each terminal adapter would not receive a stream of incoming multi-link PPP packets with sequence numbers that would consecutively increase by one, but rather would increase by the number of links across which the personal computer is distributing the multi-link PPP packets. The existence of incoming multi-link PPP packets, at each terminal adapter, with gaps in their sequence numbers would totally frustrate transmission of these packets through the terminal adapters and preclude their downstream communication to a PPP peer. Thus, the incoming PPP frame applied across all the terminal adapters would never "get through" the adapters.

As such, multi-link PPP packets can only be handled by communication devices that have one incoming data link and one outgoing data link. Such a device, typified by a conventional analog modem, simply transmits incoming data appearing on its incoming data link onto its outgoing data link once a communication path is established therebetween. These devices simply do not utilize the multi-link protocol and, as such, ignore the multi-link segmented nature of the incoming data. However, conventional high-speed communication devices, such as ISDN terminal adapters, that process a stream of incoming packetized data, such as through segmentation and sequencing, to utilize multiple outgoing data links can not function with, as discussed above, incoming multi-link PPP packets. Consequently, though a client PC can generate multi-link PPP packets, high speed communication devices that execute the multi-link protocol can not handle these packets as input; thus relegating a user to much slower speed communication devices, such as analog modems, that can.

Thus, in practice, the promise of providing significantly higher user transmission bandwidth, through use of client PC software that executes the multi-link protocol, has yet to be fully satisfied.

Therefore, a need exists in the art for a technique, specifically apparatus and accompanying methods, for use in a communication device with one incoming physical link and multiple outgoing physical links for properly handling incoming multi-link PPP packets. Such a technique would permit incoming multi-link PPP packets, appearing on any one of several incoming physical links, to themselves be transmitted over a pipe formed of several outgoing physical links, thereby providing significantly increased transmission bandwidth to a user. Advantageously, this technique would find particular, though not exclusive, application in, e.g., an ISDN terminal adapter which were to receive multi-link PPP packets from a client PC, thus allowing that client to simultaneously utilize more than one ISDN terminal adapter, and correspondingly more than 2 B channels on a pipe, to attain such increased bandwidth.

SUMMARY OF THE INVENTION

The present invention overcomes the deficiencies in the art and satisfies these needs by setting, in direct contravention to conventional multi-link protocol processing, an endpoint discriminator of each multi-link PPP device, connected to one end of a pipe to be formed of several physical outgoing links, to the same value as that of a neighboring PPP device that generates incoming multi-link PPP packets to the former device for transport over the outgoing links. This use of neighboring endpoint discriminator values is recursively employed at each end of the pipe to encompass all hierarchically connected multi-link PPP devices thereat, including a multi-link PPP originator thereat. As a result, all the multi-link PPP devices at one end of the pipe share a common endpoint discriminator value. Consequently, a BRI ISDN terminal adapter like device that utilizes my invention can accept and negotiate the multi-link protocol on its data terminal equipment (DTE) side where, conventionally, such a device has only one link and will accept an endpoint discriminator provided from its DTE side and use this discriminator to negotiate the multi-link protocol on multiple outgoing links connected to the device, e.g., on its public switched telephone network (PSTN) side.

In accordance with my specific inventive teachings, setting identical endpoint discriminators is readily accomplished during LCP negotiations wherein a multi-link PPP originator, such as, e.g., a server or a client application executing at a PC, assigns itself a unique endpoint discriminator value and informs all its immediate PPP peers, such as neighboring terminal adapters, by sending the latter, via a first bundle of outgoing links, an LCP Endpoint Discriminator packet containing this value. Each of these immediate PPP peers, rather than assigning itself a unique endpoint discriminator value, assumes the value that has been provided to it in the LCP Endpoint Discriminator packet it receives from the originating device, as its own endpoint discriminator. Each of these peers then, in turn, sends an LCP Endpoint Discriminator packet containing its endpoint discriminator value (i.e., that of the originating multi-link PPP system), via a second bundle of outgoing links, to its immediate PPP peers, and so forth until all hierarchically inter-connected multi-link PPP peers at one end of the pipe and which fan-out from the originator have set their endpoint discriminator to a single common value, i.e., the endpoint discriminator of the multi-link PPP originator. Each multi-link PPP device situated in a final, e.g. $m^{th}$, level of hierarchically organized multi-link PPP peers supplies the common endpoint discriminator value, through an associated LCP Endpoint Discriminator packet and via a separate physical link in the pipe, to its remote multi-link PPP peer at the other end of the pipe. Consequently, all the links in this pipe will be viewed, by the multi-link protocol, as part of a common bundle.

Furthermore, through use of the present invention, advantageously no changes need to be made to the contents of any multi-link PPP packet to transmit that packet through any one or more levels, in a hierarchy of multi-link PPP devices, with incoming multi-link being applied by any such device in, e.g., a round-robin (or other predefined) fashion among its outgoing links. Alternatively, each multi-link PPP device situated at a given level in the hierarchy can encapsulate its incoming multi-link PPP packets as segment data into new outgoing multi-link PPP packets, i.e., "multi-multi-link" PPP packets, along with a multi-link protocol header, including a sequence number appropriate to the multi-link PPP packets generated at that level, i.e., a "multi-multi-link" header.

Advantageously, through use of my invention, an incoming PPP frame formed of multi-link PPP packets can be simultaneously transmitted through several high speed communication devices—whether hierarchically organized or not, each having one incoming link and several outgoing links, thus providing significantly higher transmission bandwidths than heretofore possible with such packets.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to various figures.

DETAILED DESCRIPTION

After considering the following description, those skilled in the art will clearly realize that the teachings of the present invention can be readily utilized in conjunction with any equipment, such as illustratively a computer or terminal adapter, that can generate multi-link point-to-point (PPP) packets. Through use of the present invention, the multi-link PPP packets appearing on any one of a number of incoming links can themselves be transmitted across a pipe formed of several outgoing communication links in a bundle, wherein the packets are distributed across the outgoing links in order to simultaneously utilize the transmission bandwidth available on all these outgoing links, thereby providing enhanced channel bandwidth. To simplify the ensuing description, I will discuss my invention in the illustrative context of use within ISDN (Integrated Services Digital Network) terminal adapters, as DCE (data circuit terminating equipment) that collectively connect, e.g., a personal computer (PC) as DTE (data terminal equipment) to a pipe formed of several outgoing ISDN lines, where each line has two bearer (B) channels.

However, before discussing the invention itself, I will quickly elucidate various salient aspects of the conventional PPP protocol, as it is currently used, such that subsequently the reader can fully understand my inventive modifications to this protocol.

Figure 1:
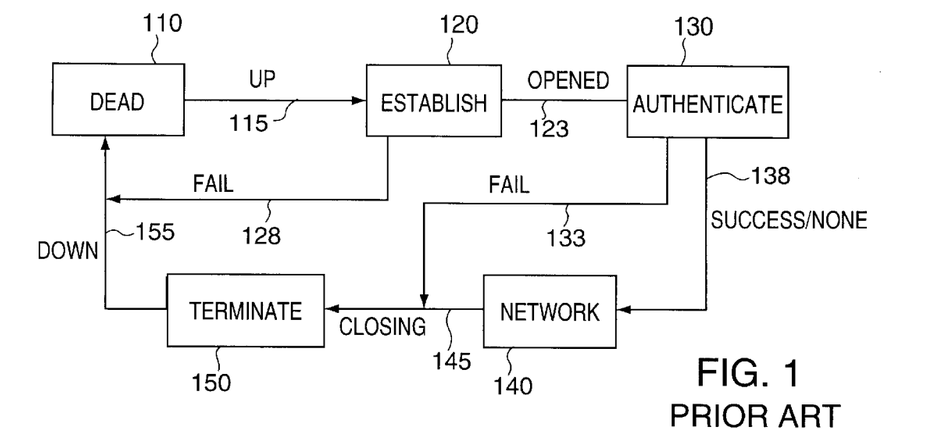
FIG. 1 diagrammatically depicts conventional states of a link that carries PPP traffic and associated state transitions therefor.

FIG. 1 diagrammatically depicts conventional states of a link that carries PPP traffic and associated state transitions therefor.

Initially, as shown, a link is in Dead state 110, during which the PPP protocol is inactive. During this state, the protocol is waiting for a physical layer (not specifically shown but well known) to signal that the link is ready. This signal may arise from an external event or activation of a data carrier detect signal in the case of a serial linkage being initiated over that link. At this point with no activity on the link, a link control protocol (LCP), which as part of the PPP protocol, exercises responsibility for establishing and configuring the link, remains in an initial or starting state. Once the physical layer has appropriately signaled that the link is ready, then the link transitions, as symbolized by UP line 115, to Establish state 120. In this state, the LCP, executing on each end of the link and through exchanging and acknowledging LCP Configure packets through the link, forms a PPP connection through the link. Should this configuration process fail, then the link transitions, via FAIL line 128, back to Dead state 110.

As part of configuring the link, if a PPP peer at either end of the link requests the use of authentication and authentication is enabled at the PPP peers at both ends of the link, then, once the link has been established by the LCP, LCP will undertake to conventionally authenticate both PPP peers. In this case, the state of the link transitions, as symbolized by OPENED line 123, to Authenticate state 130. PPP supports two standard authentication protocols: password authentication protocol (PAP) and challenge handshake authentication protocol (CHAP). Inasmuch as the authentication protocols are irrelevant to the present invention, I will omit any further details thereof. If either no authentication was requested or authentication was successful, then the link transitions, via Success/None line 138, to Network state 140. In this state, a different Network Control Protocol (NCP) for each of the desired network layer protocols, e.g. IP (Internet Protocol), IPX, DECnet, AppleTalk and others, that are to be used to carry packet traffic over that link, will then be sequentially negotiated by the PPP peers on both sides of the link, so as to properly configure the link for this traffic. Once the necessary network layer protocols have been successfully negotiated, packet traffic can then commence over the link. NCPs can be negotiated any time the link is open in order to the accommodate another network layer protocol for use over the link or to drop a network layer protocol that is no longer needed. If a particular NCP fails or an associated network layer protocol was not negotiated at all, then any packets using that protocol that are received, via the link, by either of the PPP peers will be returned to its sender using a PPP Reject packet.

If PPP traffic has concluded and either PPP peer desires to terminate the link, then the link transitions, as symbolized by CLOSING line 145, to Terminate state 150. In this state, both PPP peers exchange appropriate PPP terminate packets and, where possible, acknowledgements thereof. Link termination can occur at any time through, e.g., a failure in the link, or some other event, such as, as symbolized by FAIL line 133, an authentication failure. In the event of a link failure, no termination acknowledgements will occur; the link will simply be terminated after a predefined timeout interval occurs. However, in a non-failure condition, the PPP protocol utilizes such acknowledgements to assure a graceful link termination. Once the link has been completely terminated, the link transitions, as symbolized by DOWN line 155, back to Dead state 110, to be re-initiated at some future time and so forth.

Since my invention modifies conventional multi-link LCP packet messaging, during link configuration for multi-link operation, I will now discuss the salient, though conventional, LCP messages.

Figure 2:
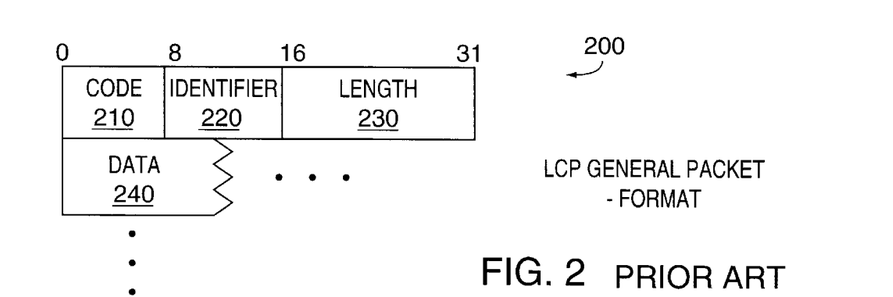
FIG. 2 depicts a format of a conventional generalized link control protocol (LCP) packet that is used during an LCP portion of the PPP protocol.

FIG. 2 depicts a format of conventional generalized LCP packet 200. As shown, packet 200 is formed of eight-bit code field 210, eight-bit identifier field 220, sixteen-bit length field 230 and finally variable-length data field 240. This packet can be any one of several types, with the value of the code field, having values typically ranging from one to thirteen, specifying the type of any such packet. Of note, a value of one indicates that the packet is an LCP Configure Request packet. Such a request packet is sent by a PPP peer whenever that peer desires to change a configuration parameter, such as from a default value, associated with the link. A code field having a value of two or three specifies the packet as an LCP Configure Positive Acknowledgement (ACK) or LCP Configure Negative Acknowledgement (NACK) which, when issued, by a receiving PPP peer, respectively specifies that options (the salient option being discussed below) in the Configuration Request were either all accepted, i.e., now being acknowledged, or one or more of these options rejected, i.e., now being negatively acknowledged, by that peer. Inasmuch as none of the other code fields is relevant to an understanding of the present invention, I will omit any further discussion of them. Identifier field 220 contains a number which is used by the protocol to match requests with their corresponding responses. The length field specifies, the overall length in octets, of the LCP packet. Data field 240 contains data carried by the LCP packet, with the actual data depending on the type of LCP packet and therefore the value of the code specified therein.

Figure 3:
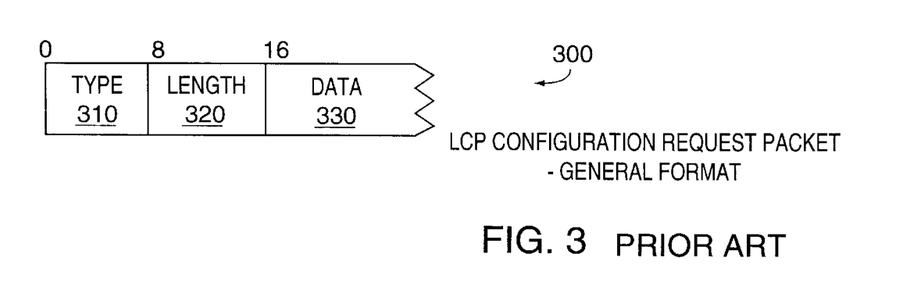
FIG. 3 depicts a format of a conventional generalized LCP Configuration Request packet which is used in configuring a link during the LCP portion of the PPP protocol.

With the above in mind, FIG. 3 depicts a format of conventional generalized LCP Configuration Request packet 300. As stated above, an LCP Configuration Request packet is sent by a PPP peer whenever that peer desires to change any default parameter associated with the link or a parameter which the link is currently using.

Packet 300 contains eight-bit type field 310, eight-bit length field 320 and variable-length data field 330. Type field contains any one of a number of predefined values, typically ranging from zero to nineteen, with the particular value specifying a particular configuration option, i.e., parameter, that is then to be set or changed. Each specific option has to be separately negotiated between the PPP peers and appropriately acknowledged prior to its use. Inasmuch as the only values for this type field, i.e., the only configuration options, that are relevant to understanding the invention are 17, 18 and 19, which designate a multi-link MRRU (Multi-link Maximum Receive Reconstructed unit) request, a multi-link Short Sequence Number header request and a "multi-link endpoint discriminator" option, respectively (which will all be discussed in detail below in conjunction with FIG. 5), I will dispense with describing any other LCP configuration options. Length field 320 specifies a length, in octets, of packet 300, including the contents of its type, length and data fields. For any particular packet 300, data field 330 contains data specific to a corresponding configuration option associated with that particular packet.

Figure 4:
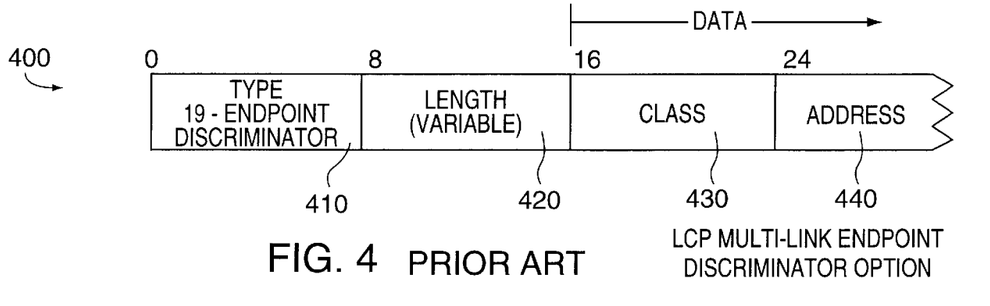
FIG. 4 depicts a format of a conventional LCP Multi-link Endpoint Discriminator Option packet which is a particular type of an LCP Configuration Request packet shown in FIG. 3.

Having described and shown a generalized LCP Configure Request packet, FIG. 4 depicts a format of conventional LCP Multi-link Endpoint Discriminator Option packet 400—which, as noted above, forms one type of the LCP Configure Request packet. The endpoint discriminator packet identifies, by specifying an address, of an end system (an "endpoint"), then situated on an end of a link, that is transmitting this particular packet. This peer can be an existing system, i.e., one whose address has already been specified through prior LCP negotiations to its communicating peer, though using another, i.e., existing, link to that peer, or a different system altogether. If the data contained in this packet identifies the end system as an existing system (i.e., previously so identified), then, through the PPP protocol, the link will be joined to an existing bundle of links, so as to form a "pipe" among which multi-link PPP packets will be distributed for transport between the end system peer and its peer. Alternatively, if the data contained in packet 400 differs from that of any existing system, then the PPP protocol assumes a new bundle of links exists and assigns the link to this new bundle.

As depicted in FIG. 4, an LCP Configure Request packet specifies a multi-link endpoint discriminator option whenever the type field of the LCP Configure Request packet is set to value nineteen, as is field 410. Identification of the endpoint system (commonly referred to as either an "endpoint discriminator" or "endpoint identifier") is accomplished through class field 430 and address field 440, which collectively contain data carried by this packet. The class field defines the type of address then specified within the address field and its length. For example, a class field having a value of illustratively zero, one or two specifies that the following address is a null class (i.e., the address is zero octets long), a locally assigned address, such as a serial number (having a length up to twenty octets), or an Internet Protocol (IP) address (having a length of four octets). Other classes of addresses exist. Inasmuch as the invention functions equally well with any such address and the manner through which an address is assigned and its respective class are irrelevant to the present invention, I will omit any further details of the latter two aspects. Length field 420 specifies overall length in octets, of LCP packet 400.

Once the multi-link protocol has been successfully negotiated by the LCP between two PPP peers for use with a pipe, then, at a transmitting peer, the multi-link protocol segments a packetized PPP data stream (referred to as a PPP frame) into segments (also called fragments), forms a stream of multi-link PPP packets each containing one such a segment, and then assigns these multi-link PPP packets on an approximately equal basis, generally speaking and where practical, between all the links in the pipe. Each such multi-link PPP packet contains a sequence number—which increases by one with each successive packet, inserted by the multi-link protocol. At the receiving peer, the multi-link protocol extracts the segments from the received packets carried by the pipe, and re-assembles the payload data contained in these segments into proper order based on their corresponding sequence numbers to properly reconstruct the PPP frame.

Figure 5:
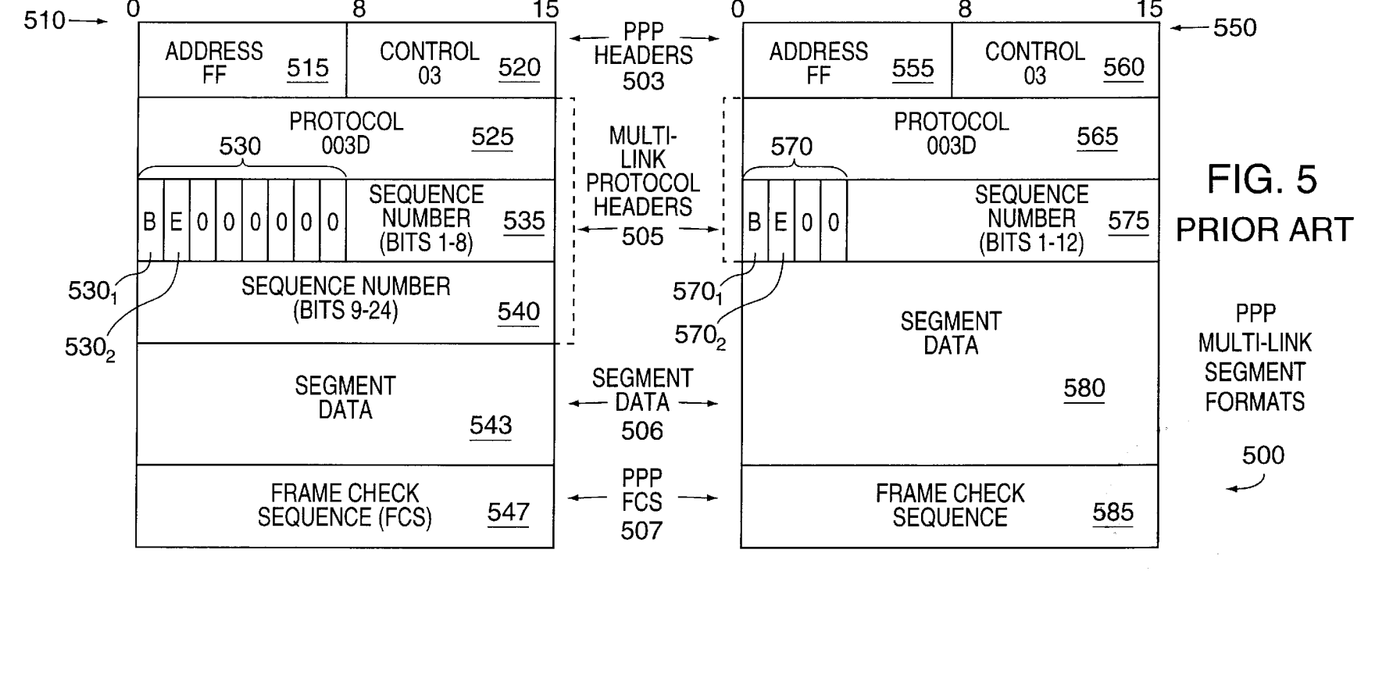
FIG. 5 depicts two conventional formats for multi-link PPP packets.

FIG. 5 depicts two alternate and conventional formats 500 of multi-link PPP packets, with a difference therebetween being a length of the sequence number. These formats are depicted as long and short sequence number formats 510 and 550 having 24- and 12-bit sequence numbers, respectively. The specific format of the multi-link PPP packet to use in any situation can be specified by a PPP sender by transmitting an LCP Configuration Request message for a Multi-link Maximum Receive Reconstructed Unit (MRRU) format, i.e., designating long sequence number format 510, or a Multi-link Short Sequence Number Header format, i.e., designating short sequence number format 550, coupled with successful negotiations with its PPP peer therefor. Use of format 510 or 550 is requested by a type field having a value of 17 or 18, respectively, in an LCP Configure Request message, as noted above, transmitted by the PPP sender to its PPP peer. The format of the multi-link PPP packet is negotiated before an LCP Configure Request packet is transmitted by the PPP sender on a given link to specify its endpoint discriminator (endpoint identifier) to its PPP peer on that link. As discussed above, the discriminator determines whether that link should join an existing bundle of links connecting these PPP peers or whether a new bundle should be established for that link.

Focusing on long sequence number format 510 for the moment, this format contains PPP link layer frame header 503, encapsulated multi-link protocol header 505, encapsulated segment data 506 and PPP frame check sequence (FCS) field 507. The PPP link layer frame header itself contains address field 515, specifically having a predefined value of "FF", and control field 520 having a predefined value of "03(hex)". Following PPP link layer frame header 503, format 510 contains, in seriatim, protocol field 525, flag field 530 and sequence number fields 535 and 540. The protocol field has a value of "003D" which identifies the multi-link protocol; hence specifying that the entire packet is to be processed through the multi-link protocol. Flag field 530 contains 8-bits, the first two of which, i.e., bits $530_1$ and $530_2$ in bit positions 1 and 2, indicate, by a high setting, whether the segment data contained in this packet is a beginning (B) or ending (E) segment in a packetized data stream, or neither. The values of the remaining six bits in flag field 530 are all set to zero. Field 535 contains the most significant eight bits of the sequence number assigned to this multi-link PPP packet by the multi-link protocol; with the remaining sixteen bits being provided in field 540. Fields 525, 530, 535 and 540 collectively form multi-link protocol header 505.

The multi-link protocol increments the sequence number by one for each successive multi-link PPP packet in a multi-link transmission, such that these packets can be properly reordered upon reception to reconstitute a correct PPP frame. Segment data 506 contains the actual segment data in field 543 carried by this multi-link PPP packet. PPP FCS field 507 follows the segment data. The FCS field, being either 16-bits (LCP default value, as shown) or alternatively 32-bits in length (if specifically negotiated through a corresponding LCP Configuration Request option), contains FCS field 547. Field 547 contains a value, generated through a conventional cyclic redundancy check, which is used to ensure integrity of the packet when received. In essence, a sending system which transmits a multi-link PPP packet calculates an FCS value, based on the PPP link layer header, protocol, sequence number fields and the segment data and then inserts a resulting FCS value into field 547. Upon receiving the packet, a receiving PPP peer recalculates the FCS value based on the same components of the multi-link PPP packet, compares the recalculated value to the FCS value specified in field 547 of the received packet and, if the two values match, accepts the multi-link PPP packet as being "good" hence warranting further processing, or, if not, rejects and discards the packet and supplies an appropriate reject message to the sending system.

Short sequence number format 550 is highly similar to format 510. Apart from the multi-link protocol header contained in this packet, the remaining fields of this packet; namely PPP header 503, here containing fields 555 and 560, segment data 506, containing segment data field 580, and FCS field 507 containing FCS field 585, are identical to fields 515, 520, 543 and 547, respectively, in format 510. Protocol field 565 is identical to protocol field 525. Rather than containing an eight-bit flag field followed by a 24-bit sequence number field, format 550 contains four-bit flag field 570 (only having two rather than six lower-order zero-valued bits) followed by 12-bit sequence number field 575. In an identical fashion to flag field 530 in format 510, the first two bits of flag field 570, i.e., bits $570_1$ and $570_2$, contain values for the beginning and ending flags (B and E), respectively, associated with the segment data in field 580 carried by the multi-link PPP packet.

For further information on the PPP protocol, the reader is referred to Section 22.3, "The Point-to-Point Protocol" on pages 402–434 of P. Miller, *TCP/IP Explained*, Digital Press (© 1997, Butterworth-Heinemann), which is incorporated by reference herein.

Figure 6A:
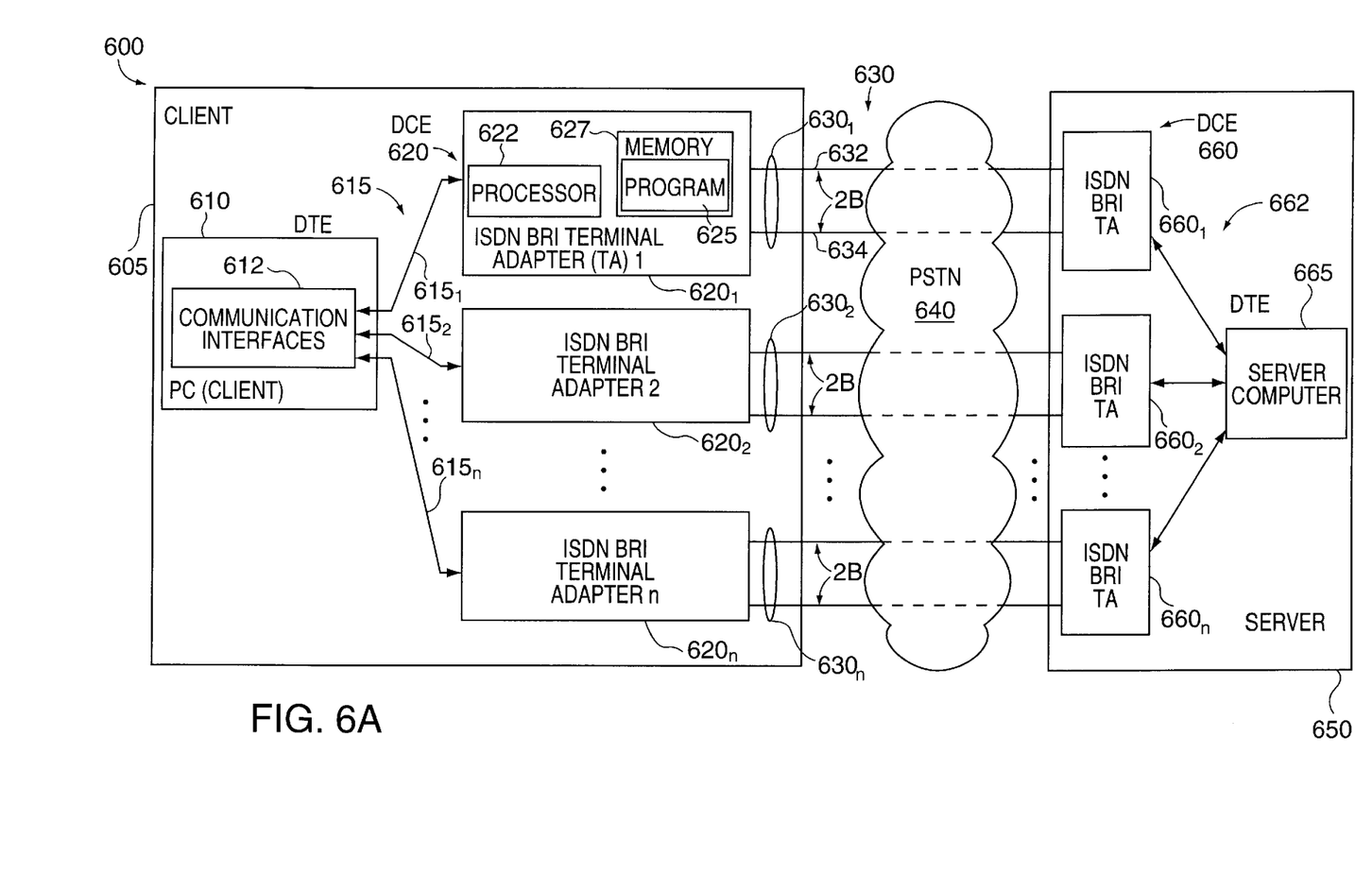
FIG. 6A depicts a high level block diagram of illustrative multi-link client-server communication apparatus 600 that simultaneously utilizes multiple links to carry inventive multi-multi-link PPP packets.

With the above discussion of conventional multi-link PPP in mind, consider FIG. 6A which depicts a high level block diagram of illustrative multi-link client-server apparatus 600, which incorporates the teachings of the present invention. Here, client 605 is inter-connected to server 650 through multiple ISDN BRI (basic rate interface) lines 630.

Client 605 is formed of client PC 610, as DTE (data terminating equipment), connected, through internal communication interfaces 612, typically separate serial ports (not specifically identified), and via corresponding links 615, to multiple identical ISDN BRI terminal adapters 620 as DCE (data circuit terminating equipment). In that regard, links 615, which comprise links $615_1$, $615_2$, ..., $615_n$, connect separate terminal adapters $620_1$, $620_2$, ..., $620_n$, respectively, to separate corresponding serial ports provided by communication interfaces 612. Terminal adapter $620_1$ contains, to the extent relevant, processor 622, typically a conventional microprocessor, and memory 627, the latter having program store 625 which stores computer executable instructions (along with accompanying data values) that, when executed by the processor, control the operation of the terminal adapter and specifically, among other functions, implement my inventive technique. Each of the other terminal adapters is identical to adapter $620_1$. All these terminal adapters are collectively connected to one end of ISDN BRI lines 630, with each terminal adapter $620_1$, $620_2$, ..., $620_n$, being individually connected to a pair of lines for two ISDN B channels, specifically lines $630_1$ (having a separate pair of links 632 and 634 for pair of B channels), $630_2$, ..., $630_n$, respectively. Though each ISDN BRI connection also entails a separate ISDN data ("D") channel connection, for simplicity, all such D-channel connections, which are readily apparent to those skilled in the art, are omitted from the figure and will not be discussed further. ISDN connections are extended from terminal adapters 620, through public switched telephone network (PSTN) 640, to server 650 having corresponding identical terminal adapters 660, as DCE, and server computer 665, as DTE. Each one of terminal adapters 620 is connected through a separate pair of ISDN B-channels and the PSTN, to a separate corresponding one of terminal adapters 660, the latter terminal adapters collectively connected, via links 662, to server computer 665. Each of adapters 660 is illustratively identical to each of adapters 620.

To make maximum use of available bandwidth on two B-channels, each of terminal adapters 620 would execute the multi-link protocol in an attempt to segment a PPP frame appearing on its input lead, e.g., lead $615_1$ for terminal adapter $620_1$, into multi-link PPP packets for carriage over its corresponding pair of B-channels, e.g., lines $630_1$.

Currently, client PC 610 can utilize any one of various existing operating systems that, if appropriately configured, is able to segment a PPP frame into multi-link PPP packets and distribute those packets among multiple links in a bundle (i.e., a pipe). Inasmuch as presently available ISDN terminal adapters have only one physical link on their DTE side, such as link $615_1$ if terminal adapter $620_1$ were to be conventional, these adapters unfortunately do not attempt to accept multi-link PPP packets and send those packets over both of their BRI links, e.g., links $630_1$, towards a PSTN, here PSTN 640. If multi-link PPP packets were to be applied over links 615—in an effort to utilize bandwidth provided across multiple ISDN BRI lines 630, then the multi-link PPP packets would not pass through ISDN terminal adapters 660 (adapters 620 for packets flowing in an opposite direction).

In particular, as discussed above and depicted in FIG. 5, each multi-link PPP packet generated by client PC 610, shown in FIG. 6A, would contain a sequence number which increments by one from each multi-link PPP packet to the next in a common PPP frame. To ensure proper ordering, each of terminal adapters 660 would buffer each incoming multi-link PPP packet it receives, via links 630, from its corresponding PPP peer in adapters 620, and then reorder its received packets based on their sequence numbers, and then transmit only properly reordered packets to server computer 665. Inasmuch as PC 610 is distributing the multi-link PPP packets, typically in sequential round-robin fashion, amongst terminal adapters 620, each one of terminal adapters 660 would receive packets having sequence numbers that increment not by the value one but by the integer value n; hence, skipping intervening sequence numbers. Under conventional multi-link protocol processing, if incoming multi-link PPP packets were received by any given terminal adapter, such as in adapters 660, but with gaps in their sequence numbers, then each of these terminal adapters would simply buffer these incoming packets pending receipt of those packets containing the missing (here skipped) sequence numbers. Since packets with "skipped" sequence numbers would have been intentionally sent by client PC 610, via links 615, to adapters, within adapters 620, other than the peer to the given adapter, then the "missing" packets would simply never arrive at the given terminal adapter. As a result, the given adapter would continually buffer its incoming multi-link PPP packets pending the receipt of multi-link PPP packets that would never arrive. Hence, the buffered packets would not be forwarded by the terminal adapters to server computer 665. Thus, the incoming PPP frame applied across all terminal adapters 620 would never "get through" all the adapters to the server computer.

Consequently, with conventional multi-link protocol processing, multi-link PPP packets can only be handled by communication devices, such as, e.g., modems, that have one incoming data link and one outgoing data link, and not by higher-speed devices, such as ISDN terminal adapters that provide multiple outgoing links and execute the protocol. Unfortunately, the former devices generally provide significantly less transmission bandwidth that do the latter; thus, relegating client PC 610, should it use multi-link PPP, to use of markedly slower transmission speeds.

As a result of the present invention, I have advantageously surmounted this limitation in the art.

In particular, I have discovered that this drawback arises, due to various reasons: (a) terminal adapters 620, as conventionally constituted, do not accept multi-link PPP packets inasmuch as these adapters possess only one physical link to their DTE, here DTE 610; (b) strict frame re-assembly mechanism used in the multi-link protocol which inhibits frames from reaching a destination server, e.g., here server computer 665, from terminal adapters 660, if conventionally constituted; and (c) the conventional manner through which the multi-link protocol, in a PPP system at one end of a link, utilizes the endpoint discriminator (endpoint identifier) provided by each multi-link PPP peer connected to an opposite end of that link. As generally discussed above, during LCP negotiations, a multi-link PPP system at the end of each link in a multi-link PPP bundle will supply its unique endpoint discriminator address to the PPP system situated at the other end of that link. As such, each ISDN terminal adapter, as a multi-link PPP system, will conventionally have a different endpoint discriminator associated with it. Consequently, the conventional multi-link protocol, executing at, e.g., client PC 610 or server computer 665, will not treat all terminal adapters 620 or adapters 660, respectively, as being linked to a common bundle (i.e., a single pipe formed of ISDN lines 630) for purposes of carrying multi-link PPP packets. Specifically, under the conventional multi-link protocol, the client PC (and server computer 665) will assume that the ISDN BRI line (pair of B channels) associated with each of terminal adapters 620 (and 660, respectively) is associated with a different bundle. Hence, packets appearing across the separate pairs of B channels and generated by an application executing at the client PC would not be properly re-assembled at the opposite end of, what should constitute a pipe, by the server into a common PPP frame (and similarly with multi-link PPP packets for a common PPP frame that were expected to travel in a reverse direction from the server to the client application at the PC).

Therefore, in accordance with my invention, and directly contrary to conventional multi-link protocol processing, each multi-link PPP device connected to one end of a pipe to be formed of several physical outgoing links, such as JSDN lines, sets its endpoint discriminator value to the same value as that of a neighboring PPP device that generates incoming multi-link PPP packets to the former device for transport over the outgoing links. This use of neighboring endpoint discriminator values is recursively employed at each end of the pipe to encompass all hierarchically connected devices thereat, including a multi-link PPP originator, such as a client or server computer, thereat. As a result, all the multi-link PPP devices at one end of the pipe share a common endpoint discriminator value.

This is readily accomplished during LCP negotiations wherein a multi-link PPP originator, such as, e.g., a server or a client application executing at a PC, assigns itself a unique endpoint discriminator value and informs all its immediate PPP peers, such as neighboring terminal adapters, by sending the latter, via a bundle of outgoing links, an LCP Endpoint Discriminator packet containing this value. In accordance with my invention, each of these immediate PPP peers, rather than assigning itself a unique endpoint discriminator value, assumes the value that has been provided to it in the LCP Endpoint Discriminator packet it receives from the originator, as its own endpoint discriminator. Each of these peers then, in turn, sends an LCP Endpoint Discriminator packet containing its endpoint discriminator value (i.e., that of the multi-link PPP originator), via a second bundle of outgoing links, to its immediate PPP peers, and so forth until all the hierarchically inter-connected multi-link PPP peers at one end of the pipe and which fan-out from the originator have set their endpoint discriminator to a single common value, i.e., the endpoint discriminator of the originator. Each multi-link PPP device situated in a final, e.g., $m^{th}$, level of hierarchically organized multi-link PPP peers supplies the common endpoint discriminator value, through an associated LCP Endpoint Discriminator packet and via a separate physical link in the pipe, to its remote multi-link PPP peer at the other end of the pipe. Consequently, all the links in this pipe will be viewed, by the multi-link protocol, as part of a common bundle.

Figure 6B:
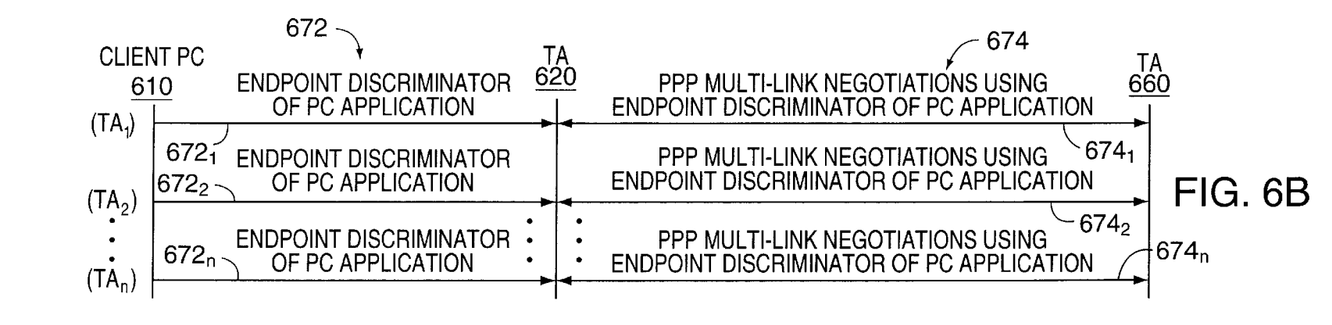
FIG. 6B depicts use, in accordance with the present invention, of an endpoint discriminator for client PC 610, shown in FIG. 6A.

Hence, for client-server apparatus 600 shown in FIG. 6A and through the teachings of my invention, a client application executing at client PC 610, during the course of configuring links 615 connecting the PC with terminal adapters 620, will establish its own endpoint discriminator value which, in turn, it will supply, via LCP Endpoint Discriminator packets during LCP negotiations, to each of terminal adapters 620. This is symbolized by lines 672 shown in FIG. 6B wherein client PC 610 sends its endpoint discriminator value to each of terminal adapters $620_1$, $620_2$, ..., $620_n$ as specifically symbolized by lines $672_1$, $672_2$, ..., $672_n$, respectively. Only one hierarchical level of multi-link PPP devices, here terminal adapters 620, exists within client 605. Each of these terminal adapters will then set the value of its own endpoint discriminator to match that of the application at the client PC. Thereafter, while each of terminal adapters 620 negotiates with a corresponding one of far-end terminal adapters 660 during the LCP phase of PPP negotiations to configure links 630, each of terminal adapters 620 will transmit an outgoing LCP Endpoint Discriminator packet to its multi-link peer within terminal adapters 660. This is symbolized by lines 674 shown in FIG. 6B wherein each of terminal adapters 620, specifically terminal adapters $620_1$, $620_2$, ..., $620_n$ (also denoted as $TA_1$, $TA_2$, ..., $TA_n$, respectively), sends the same endpoint discriminator value to its corresponding peer in terminal adapters 660, specifically $660_1$, $660_2$, ..., $660_n$ as specifically symbolized by respective lines $674_1$, $674_2$, ..., $674_n$. As a result, server computer 665, by virtue of the common endpoint discriminator associated the application executing at client PC 610 and with every ISDN BRI (B channel pair) emanating from client 605, will then, through conventional multi-link protocol processing correctly view links 630 as a common bundle, i.e., a pipe, for packets generated by and destined to this application and handle packets appearing thereon as multi-link PPP packets. Additionally, both peer terminal adapters will realize that they will be performing multi-multi-link PPP by mutual agreement; the agreement resulting from appropriate LCP negotiations.

To ensure proper re-ordering, upon ultimate reception at a far-end location, of multi-link PPP packets that are to be transmitted at each level, either of two approaches can be used inasmuch as both peer devices (in, e.g., adapters 620 and 660) realize that they are performing multi-multi-link PPP. First, a transmitting side device which transmits (e.g., any of devices 620 or 660) an incoming packet need not split any of these incoming packets but can alternate these packets between each of its physical links, i.e., applies these packets in a round-robin (or other predefined) fashion among its outgoing links. In this scenario, no changes need to be made to the contents of each of these incoming packets to transmit that packet through one or more levels in a hierarchy of multi-link PPP devices. A receiving side device merely passes the multi-link packets it receives to its associated DTE in increasing order of the sequence numbers of the packets its received, while ignoring beginning and ending flags in the multi-link header of each such packet. Second, if either side at any level in the hierarchy desires to split its incoming multi-link packets, then each multi-link PPP device situated at that level encapsulates its incoming multi-link PPP packets as segment data into new outgoing multi-link PPP packets, which I refer to as "multi-multi-link" PPP packets. Each multi-multi-link PPP packet produced at that level has a separate predefined PPP header, a multi-link protocol header appropriate to that level (forming what I refer to as a "multi-multi-link" header), an incoming multi-link packet as segment data, and a corresponding frame check sequence field.

Figure 6C:
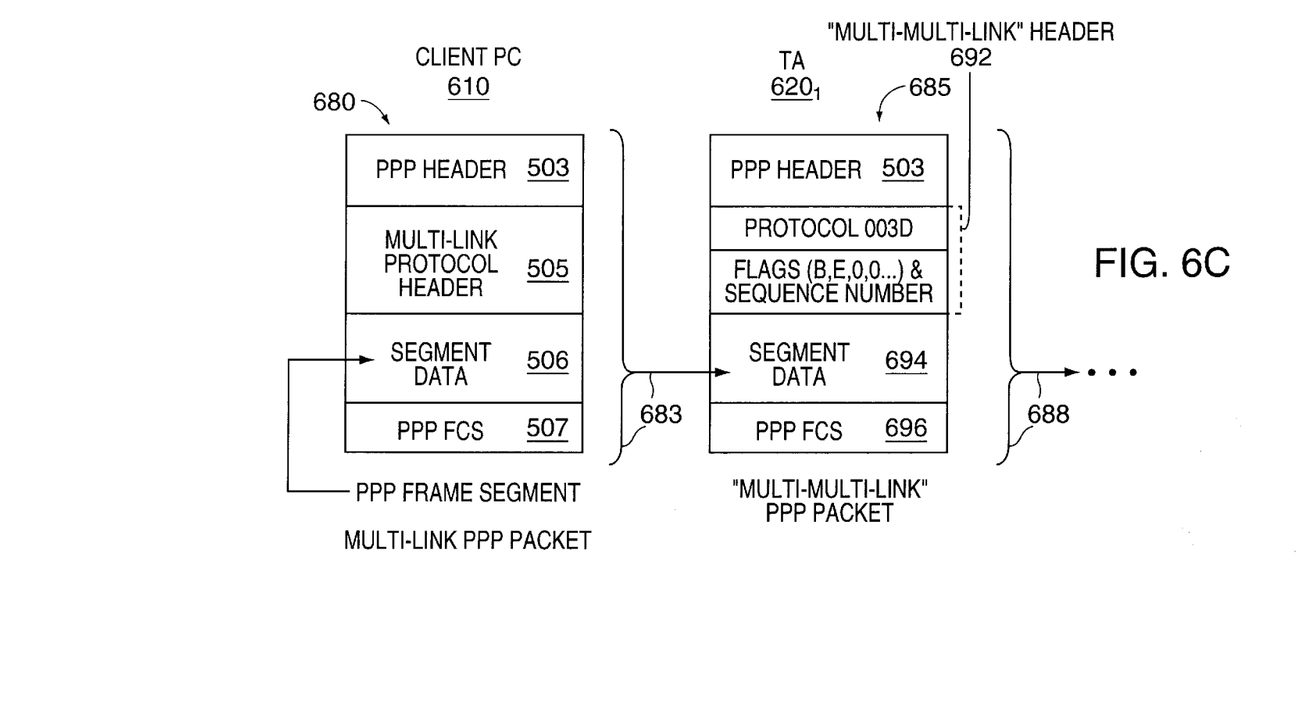
FIG. 6C depicts multi-link PPP and inventive multi-multi-link PPP packets generated by client PC 610 and terminal adapters 620, respectively, shown in FIG. 6A.

In particular, as shown in FIG. 6C, for apparatus 600, each multi-link PPP packet produced by an application executing at client PC is depicted as packet 680, and has the general format discussed above in conjunction with FIG. 5. In that regard, a PPP frame produced by the client application executing at client PC 610 is segmented and sequenced by the multi-link protocol executing within the PC with a particular frame segment, here segment 506, being encapsulated with PPP header 503, multi-link protocol header 505 and frame check sequence (FCS) 507 to form packet 680. Within packet 680, the multi-link protocol header contains an assigned sequence number for the encapsulated frame segment. Each such multi-link packet 680 incident upon a given terminal adapter, e.g. adapter 620$_1$, is itself then encapsulated, as symbolized by brace and arrow 683, as segment data 694, and sequenced by that terminal adapter into an outgoing multi-link packet, i.e., "multi-multi-link" packet 685. The latter packet also contains PPP header 503, which is the same for both multi-link and multi-multi-link PPP packets; multi-multi-link header 692, and PPP FCS field 696. Multi-multi-link header 692, has an identical format as that of header 505, but contains beginning and ending (B and E) flags and a sequence number pertinent to the segment data contained within packet 685. FCS field 696 serves the same function and is identical in format to FCS field 507 but has a value associated with the contents of: PPP link layer header 503, protocol and sequence number fields in header 692 and segment data 694. Should terminal adapters 620 feed another level of multi-link PPP devices (which is not the case in FIG. 6A), then each multi-multi-link packet 685 incoming to any terminal adapter at this level would itself be encapsulated in its entirety, as symbolized by brace and arrow 688, by that particular terminal adapter into an outgoing multi-multi-link packet, and so on for each additional level of hierarchically related multi-link PPP devices. Furthermore, since some of the fields and their values in each outgoing multi-multi-link packet generated by a terminal adapter will be common to the corresponding fields and their values, respectively, in the incoming multi-link PPP packets applied thereto, such as, e.g., PPP header 503 and protocol field 525, these fields can simply be reused and not duplicated in the multi-multi-link PPP packets, thereby reducing packet size and conserving transmission bandwidth.

Advantageously, through use of my invention, an incoming PPP frame formed of multi-link PPP packets can be simultaneously transmitted through several high speed communication devices—whether hierarchically organized or not, each having one incoming link and several outgoing links, thereby providing significantly higher transmission bandwidths than heretofore possible with such packets.

Figure 7:
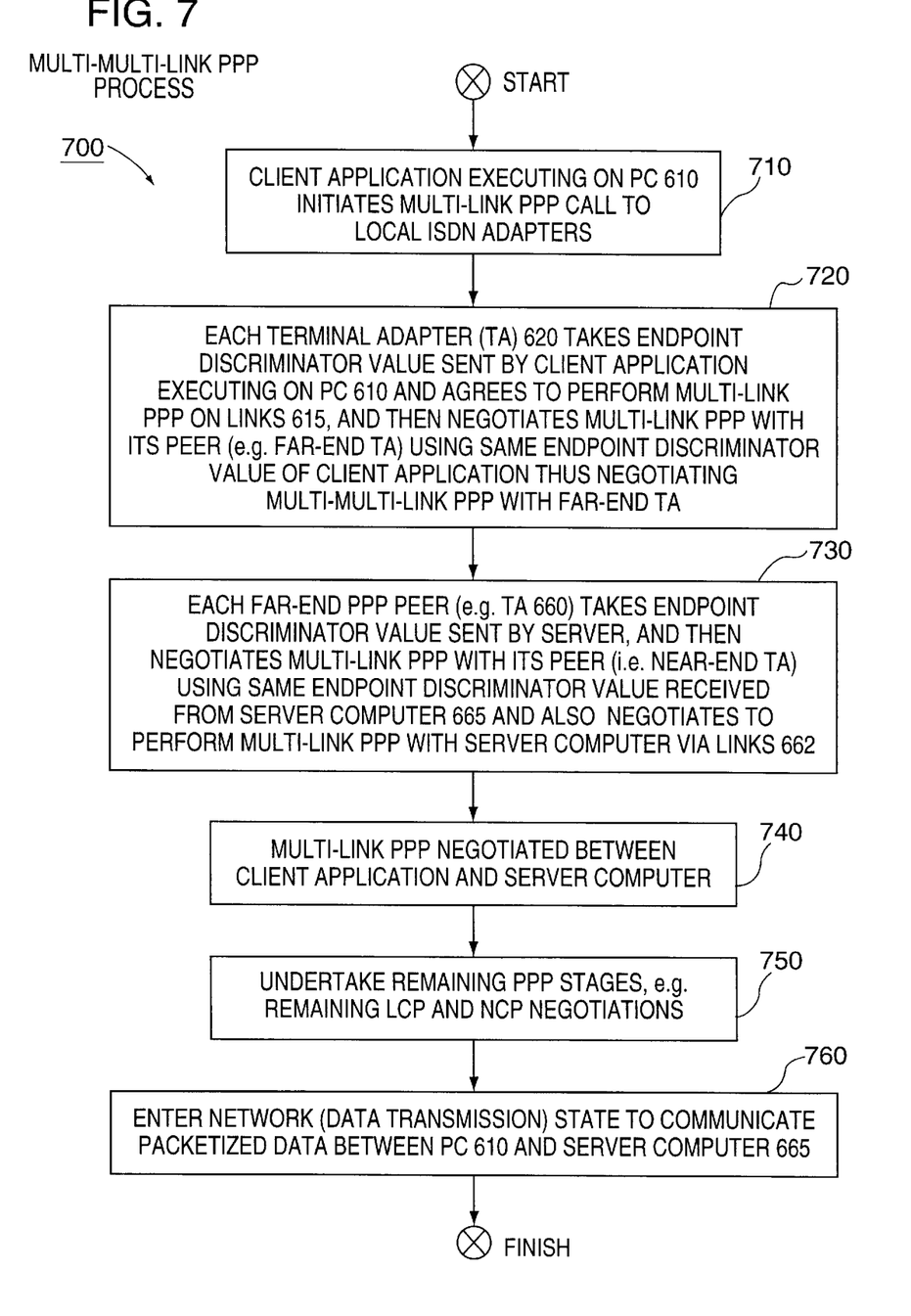
FIG. 7 depicts a high-level flowchart of my inventive Multi-multi-link PPP process 700 that is performed by apparatus 600 shown in FIG. 6A.

FIG. 7 depicts a high-level flowchart of my inventive Multi-multi-link PPP process 700 that is performed by apparatus 600 shown in FIG. 6.

As shown, process 700 begins with step 710 wherein, e.g., a client application executing at PC 610 initiates a multi-link PPP ISDN call through these adapters to a remote site. Once this occurs, step 720 occurs through which each of near-end terminal adapters 620 takes the endpoint discriminator value (the contents of both class field 430 and address field 440 shown in FIG. 4) sent by the client PC as part of an LCP Multi-link Endpoint Discriminator Option packet as its own endpoint discriminator and agrees to perform multi-link PPP via links 615. Thereafter, this particular terminal adapter then negotiates with its far-end PPP peer, i.e., one of far-end terminal adapters 660 to perform multi-multi-link PPP therewith. During the course of LCP negotiations therewith, the near-end terminal adapter sends its peer far-end adapter an LCP Multi-link Endpoint Discriminator Option packet containing the endpoint discriminator value of the former adapter, i.e., that associated with the client application. Once this occurs, then process 700 progresses to step 730. At this step, each of far-end terminal adapters 660 takes the endpoint discriminator value (the contents of both class field 430 and address field 440 shown in FIG. 4) sent by server computer 665 as part of an LCP Multi-link Endpoint Discriminator Option packet as its own endpoint discriminator. Thereafter, this particular terminal adapter then negotiates with its near-end PPP peer, i.e., one of terminal adapters 620, and also negotiates to perform multi-link PPP with server computer 665, via links 662. During the course of LCP negotiations, the far-end terminal adapter sends its peer near-end adapter an LCP Multi-link Endpoint Discriminator Option packet containing the endpoint discriminator value of the former adapter, i.e., that associated with the server computer. After this occurs, step 740 occurs during which multi-link PPP operation is negotiated between the client application, executing on the PC, and the server computer. When these negotiations successfully complete, step 750 is performed to complete PPP negotiations by negotiating any remaining LCP configuration requests and appropriate network control protocols (NCPs) pertinent to the specific network layer protocols to be used between the client application and the server computer. Once these negotiations are successfully concluded, then process 700 progresses to step 760 at which the links between the near and far-end terminal adapters all enter network (data transmission) state 140 (see FIG. 1) during which communicate packetized data can be transported between the client PC and the server computer. When all such communication subsequently terminates, either intentionally or through a fault condition (such as through, e.g., a link failure), process 700 ends.

Figure 8:
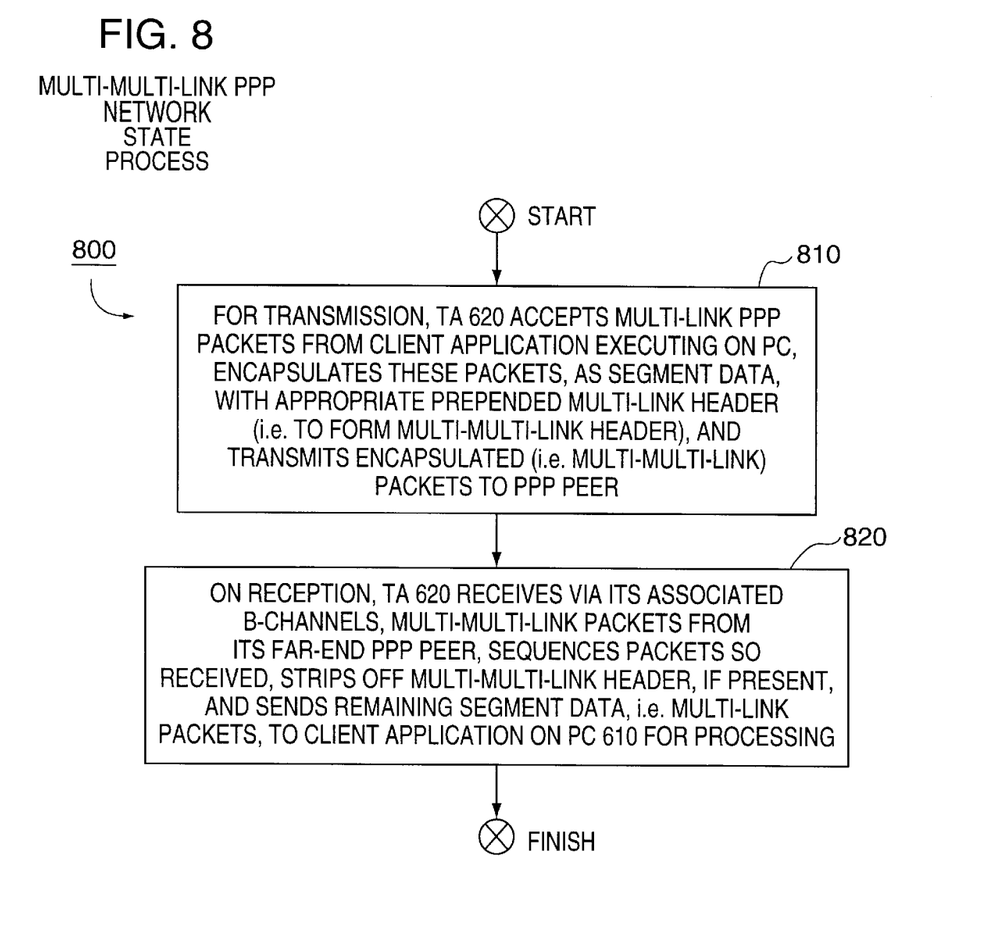
FIG. 8 depicts a high-level flowchart of my inventive Multi-multi-link Network State process 800 that is performed by each terminal adapter, illustratively each of adapters 620, shown in FIG. 6, to handle transmission and reception of multi-multi-link PPP packets, during network state 140, as shown in FIG. 1, of the PPP protocol.

FIG. 8 depicts a high-level flowchart of my inventive Multi-multi-link Network State process 800 that is performed by each terminal adapter, such as illustratively each of adapters 620, shown in FIG. 6, to handle transmission and reception of multi-multi-link PPP packets, during the network state.

As shown, process 800 contains two steps 810 and 820, to accommodate transmission and reception of multi-multi-link PPP packets. Though these steps are shown with transmission occurring first, this is merely for purposes of illustration; either step can occur first and, as often occurs, execution can repeatedly alternate between these steps.

During step 810, to transmit outgoing packets, the terminal adapter accepts incoming multi-link PPP packets generated by the client application executing on the PC. The terminal adapter then encapsulates these packets, as segment data and as shown in FIG. 6C, with, inter alia, appropriate prepended multi-link headers 692 (see FIG. 6C) (to form multi-multi-link headers) and transmits the resulting multi-multi-link PPP packets to its far-end PPP peer.

Step 820 occurs for packet reception. During this step, the terminal adapter receives, via one of its associated B-channels, incoming multi-multi-link PPP packets. Thereafter, these incoming packets are properly buffered and ordered based on the sequence numbers contained in their multi-multi-link headers. Once this occurs, the multi-multi-link header is then stripped off each such buffered packet, with the multi-link PPP packets contained in the segment data being sent to the client application executing at PC 610. When packet transmission concludes, i.e., the network stage terminates, process 800 ends.

Though the inventive apparatus has been shown and described in detail with only one hierarchical level of multi-link PPP communication devices, each with one incoming link and several outgoing links, at both the client and server sites, those skilled in the art can readily expand this apparatus to accommodate substantially any number and hierarchical organization of levels of multi-link PPP communication devices in order to demultiplex multi-link PPP packets across an increased number of physical links in a pipe connecting two disparate locations. Hence, through the present invention, a link in an original multi-link bundle and carrying multi-link PPP packets can itself be effectively divided (demultiplexed) into substantially any number of different paths with these paths being remotely and correctly recombined (multiplexed) so as to appear to be a link of the original multi-link bundle.

Furthermore, if all multi-link PPP links in a bundle have same data transmission rate such as two B-channels in an ISDN line, then each terminal adapter can simply send its incoming multi-link PPP packets as outgoing multi-link PPP packets on alternating B-channels without the need to encapsulate these packets with multi-multi-link protocol headers. If more than two such links exist in a bundle, then such outgoing packets can be distributed through a predefined sequential ordering among these links with its peer terminal adapter ordering its incoming packets from those links on that same sequential basis. In this instance, both the near- and far-end terminal adapters would need to be synchronized, which could be accomplished during multi-link PPP negotiations, such that both adapters would start with the same link and progress through all the links connected thereto at the same rate and in the same order. However, if the same data transmission rate can not be guaranteed across all links in a common bundle, then packet encapsulation of incoming multi-link PPP packets with multi-multi-link headers and ordering of incoming multi-multi-link PPP packets based on their multi-multi-link headers should preferably be used.

Although a single embodiment which incorporates the teachings of my present invention has been shown and described in detail herein, those skilled in the art can readily devise many other embodiments that still utilize these teachings.

I claim:

1. A method for use in communicating multi-link PPP packets from a multi-link originator through a plurality of communications devices onto multiple outgoing links, each of the devices having one incoming link and a plurality of the outgoing links, the incoming links for all of said devices defining a bundle of first links, wherein the originator is connected to each different one of the devices through a different corresponding link in said first links, with all of the outgoing links from all of the devices forming a bundle of second links, wherein the method comprises the steps of:

in the originator:
transmitting to each different one of the devices over a different corresponding one of the first links and during a configuration phase of a point-to-point (PPP) protocol for said corresponding one first link, a first packet containing an endpoint value which specifies an address that identifies the originator to said one device; and in said each different one device:
receiving the first packet transmitted by the originator;
assigning the endpoint value in the first packet to be the endpoint value of said one device; and
transmitting, over a corresponding one of the second links, connected at one end thereof to said one device, to a PPP peer situated at an opposite end of said one of the second links, and during a configuration phase of a PPP protocol for said one of the second links, a second packet containing the endpoint value of said one device wherein said one of said second links connects said one device and said PPP peer, whereby the originator and all of the communication devices have a common endpoint value.

2. The method in claim 1 further comprising the steps of, in the different one device:
performing multi-link negotiations with the originator; and
sequencing outgoing multi-link packets for transport over the plurality of second links connected to the different one device.

3. The method in claim 2 wherein the sequencing step comprises the step of either:
applying individual ones of the incoming multi-link packets as outgoing multi-link packets, in a predefined fashion, to corresponding ones of the outgoing links connected to the different one device; or
forming and transmitting multi-multi-link packets comprising the steps of:
encapsulating each of the incoming multi-link packets with at least an associated sequence number to form a corresponding multi-multi-link packet; and
transmitting the corresponding multi-multi-link packet to the PPP peer over the bundle of the second links.

4. The method in claim 3 wherein the applying step comprises the step of applying each individual one of the incoming multi-link packets to successive ones of the outgoing links such that the incoming packets are distributed amongst the outgoing links, connected to the different one device, in a round-robin fashion.

5. The method in claim 3 wherein the second packet transmitting step comprises the step of sending the second packet over each of the second links connected to said one corresponding device.

6. The method in claim 5 wherein each of the communication devices is an integrated services digital network (ISDN) terminal adapter and each of the second links is an ISDN bearer (B) channel.

7. The method in claim 6 wherein the endpoint value is a link control protocol (LCP) endpoint discriminator value, the endpoint discriminator value having a unique address value assigned to the originator.

8. The method in claim 7 wherein the first packet and second packet transmitting steps both occur during an LCP phase of PPP protocol negotiations between the originator and said one of the devices, and between said one of the devices and the PPP peer, respectively.

9. The method in claim 8 wherein the communication devices are organized in a hierarchy having at least first and second levels of said devices, each of the levels having a plurality of different ones of the devices, and each of the devices in the first level is connected, via a corresponding plurality of third links and at a common end thereof, to each of a plurality of the devices in the second level, situated at a opposite end of the third links, wherein the method further comprises the steps of:

in each of the devices at the second level:
 a) receiving a third packet, over a corresponding one of the third links, transmitted by one of the devices at the first level and containing the endpoint value of the originator;
 b) assigning the endpoint value in the third packet to be the endpoint value of said each one device in the second level; and
 c) transmitting, over a corresponding one of a plurality of outgoing links, connected at one end thereof to said each one device at the second level, and at an opposite end thereof to a corresponding peer in the devices situated at a next successive level of the hierarchy and during a configuration phase of the PPP protocol for said corresponding one of the outgoing links connecting said each one device at the second level at the communications device at the next successive level, a fourth packet containing the endpoint value of said each one device at the second level; and
 d) repeating steps (a), (b) and (c) within each of the devices situated at each successive level in the hierarchy, such that the originator and all the devices in the hierarchy have a common endpoint value.

10. The method in claim 5 wherein the endpoint value is a link control protocol (LCP) endpoint discriminator value, the endpoint discriminator value having a unique address value assigned to the originator.

11. The method in claim 10 wherein the first packet and second packet transmitting steps both occur during an LCP phase of PPP protocol negotiations between the originator and said one of the devices, and between said one of the devices and the PPP peer, respectively.

12. The method in claim 11 wherein the communication devices are organized in a hierarchy having at least first and second levels of said devices, each of the levels having a plurality of different ones of the devices, and each of the devices in the first level is connected, via a corresponding plurality of third links and at a common end thereof, to each of a plurality of the devices in the second level, situated at a opposite end of the third links, wherein the method further comprises the steps of:

in each of the devices at the second level:
 a) receiving a third packet, over a corresponding one of the third links, transmitted by one of the devices at the first level and containing the endpoint value of the originator;
 b) assigning the endpoint value in the third packet to be the endpoint value of said each one device in the second level; and
 c) transmitting, over a corresponding one of a plurality of outgoing links, connected at one end thereof to said each one device at the second level, and at an opposite end thereof to a corresponding peer in the devices situated at a next successive level of the hierarchy and during a configuration phase of the PPP protocol for said corresponding one of the outgoing links connecting said each one device at the second level at the communications device at the next successive level, a fourth packet containing the endpoint value of said each one device at the second level; and
 d) repeating steps (a), (b) and (c) within each of the devices situated at each successive level in the hierarchy, such that the originator and all the devices in the hierarchy have a common endpoint value.

13. Apparatus having a plurality of communication devices for communicating multi-link PPP packets from a multi-link originator through the devices onto multiple outgoing links, each of the devices having one incoming link and a plurality of the outgoing links, the incoming links for all of said devices defining a bundle of first links, wherein the originator is connected to each different one of the devices through a different corresponding link in said first links, with all of the outgoing links from all of the devices forming a bundle of second links, wherein the apparatus comprises, in each of the devices:

a processor; and
a memory connected to the processor and having executable instructions stored therein; and
wherein the processor, in response to the stored instructions:
 receives a first packet transmitted by the originator over a different corresponding one of the first links and during a configuration phase of a point-to-point (PPP) protocol for said corresponding one first link, the first packet containing an endpoint value which specifies an address that identifies the originator to said one device;
 assigns the endpoint value in the first packet to be the endpoint value of said one device; and
 transmits, over a corresponding one of the second links, connected at one end thereof to said one device, to a PPP peer situated at an opposite end of said one of the second links, and during a configuration phase of a PPP protocol for said one of the second links, a second packet containing the endpoint value of said one device wherein said one of said second links connects said one device and said PPP peer, whereby the originator and all of the communication devices have a common endpoint value.

14. The apparatus in claim 13 wherein the processor, in response to the stored instructions:
performs multi-link negotiations with the originator; and
sequences outgoing multi-link packets for transport over the plurality of second links connected to the different one device.

15. The apparatus in claim 14 wherein the processor, in response to the stored instructions either:
applies individual ones of the incoming multi-link packets as outgoing multi-link packets, in a predefined fashion, to corresponding ones of the outgoing links connected to the different one device; or
encapsulates each of the incoming multi-link packets with at least an associated sequence number to form a corresponding multi-multi-link packet; and
transmits the corresponding multi-multi-link packet to the PPP peer over the bundle of the second links.

16. The apparatus in claim 15 wherein the processor, in response to the stored instructions, applies each individual one of the incoming multi-link packets to successive ones of the outgoing links such that the incoming packets are distributed amongst the outgoing links, connected to the different one device, in a round-robin fashion.

17. The apparatus in claim 15 wherein the processor, in response to the stored instructions, sends the second packet over each of the second links connected to said one corresponding device.

18. The apparatus in claim 17 wherein each of the communication devices is an integrated services digital network (ISDN) terminal adapter and each of the second links is an ISDN bearer (B) channel.

19. The apparatus in claim 18 wherein the endpoint value is a link control protocol (LCP) endpoint discriminator value, the endpoint discriminator value having a unique address value assigned to the originator.

20. The apparatus in claim 19 wherein the processor, in response to the stored instructions, receives the first packet and transmits the second packet during an LCP phase of PPP protocol negotiations between the originator and said one of the devices, and between said one of the devices and the PPP peer, respectively.

21. The apparatus in claim 20 wherein the communication devices are organized in a hierarchy having at least first and second levels of said devices, each of the levels having a plurality of different ones of the devices, and each of the devices in the first level is connected, via a corresponding plurality of third links and at a common end thereof, to each of a plurality of the devices in the second level, situated at a opposite end of the third links, wherein, in each of the devices in the second level, the processor situated therein, in response to the instructions stored in the memory therein:

receives a third packet, over a corresponding one of the third links, transmitted by one of the devices at the first level and containing the endpoint value of the originator;

assigns the endpoint value in the third packet to be the endpoint value of said each one device in the second level; and transmits, over a corresponding one of a plurality of outgoing links, connected at one end thereof to said each one device at the second level, and at an opposite end thereof to a corresponding peer in the devices situated at a next successive level of the hierarchy and during a configuration phase of the PPP protocol for said corresponding one of the outgoing links connecting said each one device at the second level at the communications device at the next successive level, a fourth packet containing the endpoint value of said each one device at the second level.

22. The apparatus in claim 17 wherein the endpoint value is a link control protocol (LCP) endpoint discriminator value, the endpoint discriminator value having a unique address value assigned to the originator.

23. The apparatus in claim 22 wherein the processor, in response to the stored instructions, receives the first packet and transmits the second packet during an LCP phase of PPP protocol negotiations between the originator and said one of the devices, and between said one of the devices and the PPP peer, respectively.

24. The apparatus in claim 23 wherein the communication devices are organized in a hierarchy having at least first and second levels of said devices, each of the levels having a plurality of different ones of the devices, and each of the devices in the first level is connected, via a corresponding plurality of third links and at a common end thereof, to each of a plurality of the devices in the second level, situated at a opposite end of the third links, wherein, in each of the devices in the second level, the processor situated therein, in response to the instructions stored in the memory therein:

receives a third packet, over a corresponding one of the third links, transmitted by one of the devices at the first level and containing the endpoint value of the originator;

assigns the endpoint value in the third packet to be the endpoint value of said each one device in the second level; and transmits, over a corresponding one of a plurality of outgoing links, connected at one end thereof to said each one device at the second level, and at an opposite end thereof to a corresponding peer in the devices situated at a next successive level of the hierarchy and during a configuration phase of the PPP protocol for said corresponding one of the outgoing links connecting said each one device at the second level at the communications device at the next successive level, a fourth packet containing the endpoint value of said each one device at the second level.

25. A method for use in a communications device having one incoming link and a plurality of outgoing links for communicating incoming multi-link PPP packets onto the outgoing links comprising the steps of:

receiving a first packet on the incoming link and during a configuration phase of a point-to-point (PPP) protocol for the incoming link, the first packet containing an endpoint value which specifies an address that identifies a multi-link originator to the device;

assigning the endpoint value in the first packet to be the endpoint value of the device; and transmitting, over one of the outgoing links and during a configuration phase of a PPP protocol for said one outgoing link, a second packet containing the endpoint value of the device whereby the originator and the device have a common endpoint value.

26. The method in claim 25 further comprising the steps of:

performing multi-link negotiations with the originator; and sequencing outgoing multi-link packets for transport over the plurality of second links connected to the different one device.

27. The method in claim 26 wherein the sequencing step comprises the step of either:

applying individual ones of the incoming multi-link packets as outgoing multi-link packets, in a predefined fashion, to corresponding ones of the outgoing links; or forming and transmitting multi-multi-link packets comprising the steps of:

encapsulating each of the incoming multi-link packets with at least an associated sequence number to form a corresponding multi-multi-link packet; and transmitting the corresponding multi-multi-link packet to the PPP peer over the outgoing links.

28. The method in claim 27 wherein the applying step comprises the step of applying each individual one of the incoming multi-link packets to successive ones of the outgoing links such that the incoming packets are distributed amongst the outgoing links in a round-robin fashion.

29. The method in claim 27 wherein the second packet transmitting step comprises the step of sending the second packet over each of the outgoing links.

30. The method in claim 29 wherein the device is an integrated services digital network (ISDN) terminal adapter and each of the outgoing links is an ISDN bearer (B) channel.

31. The method in claim 30 wherein the endpoint value is a link control protocol (LCP) endpoint discriminator value, the endpoint discriminator value having a unique address value assigned to the originator.

32. The method in claim 31 wherein the first packet and second packet transmitting steps both occur during an LCP phase of PPP protocol negotiations between the originator and the device, and between the device and a PPP peer connected thereto, respectively.

33. The method in claim 29 wherein the endpoint value is a link control protocol (LCP) endpoint discriminator value, the endpoint discriminator value having a unique address value assigned to the originator.

34. The method in claim 33 wherein the first packet and second packet transmitting steps both occur during an LCP phase of PPP protocol negotiations between the originator and the device, and between the device and a PPP peer connected thereto, respectively.

35. Apparatus for a communications device having one incoming link and a plurality of outgoing links for communicating incoming multi-link PPP packets onto the outgoing links comprising:

a processor; and a memory connected to the processor and having executable instructions stored therein;

wherein the processor, in response to the stored instructions:

receives a first packet on the incoming link and during a configuration phase of a point-to-point (PPP) protocol for the incoming link, the first packet containing an endpoint value which specifies an address that identifies a multi-link originator to the device;

assigns the endpoint value in the first packet to be the endpoint value of the device; and transmits, over one of the outgoing links and during a configuration phase of a PPP protocol for said one outgoing link, a second packet containing the endpoint value of the device whereby the originator and the device have a common endpoint value.

36. The apparatus in claim 35 wherein the processor, in response to the stored instructions:

performs multi-link negotiations with the originator; and sequences outgoing multi-link packets for transport over the plurality of second links connected to the different one device.

37. The apparatus in claim 36 wherein the processor, in response to the stored instructions either:

applying individual ones of the incoming multi-link packets as outgoing multi-link packets, in a predefined fashion, to corresponding ones of the outgoing links; or encapsulates each of the incoming multi-link packets with at least an associated sequence number to form a corresponding multi-multi-link packet; and transmits the corresponding multi-multi-link packet to the PPP peer over the outgoing links.

38. The apparatus in claim 37 wherein the processor, in response to the stored instructions, applies each individual one of the incoming multi-link packets to successive ones of the outgoing links such that the incoming packets are distributed amongst the outgoing links in a round-robin fashion.

39. The apparatus in claim 37 wherein the processor, in response to the stored instructions, sends the second packet over each of the outgoing links.

40. The apparatus in claim 39 wherein the device is an integrated services digital network (ISDN) terminal adapter and each of the outgoing links is an ISDN bearer (B) channel.

41. The apparatus in claim 40 wherein the endpoint value is a link control protocol (LCP) endpoint discriminator value, the endpoint discriminator value having a unique address value assigned to the originator.

42. The apparatus in claim 41 wherein the processor, in response to the stored instructions, receives the first packet and transmits the second packet during an LCP phase of PPP protocol negotiations between the originator and the device, and between the device and a PPP peer connected thereto, respectively.

43. The apparatus in claim 39 wherein the endpoint value is a link control protocol (LCP) endpoint discriminator value, the endpoint discriminator value having a unique address value assigned to the originator.

44. The apparatus in claim 43 wherein the processor, in response to the stored instructions, receives the first packet and transmits the second packet during an LCP phase of PPP protocol negotiations between the originator and the device, and between the device and a PPP peer connected thereto, respectively.

* * * * *